US008837690B2

(12) United States Patent
Narayan et al.

(10) Patent No.: US 8,837,690 B2
(45) Date of Patent: Sep. 16, 2014

(54) CALLEE CENTRIC LOCATION AND PRESENCE ENABLED VOICEMAIL USING SESSION INITIATED PROTOCOL ENABLED SIGNALING FOR IP MULTIMEDIA SUBSYSTEM NETWORKS

(75) Inventors: Pramodh D. Narayan, Naperville, IL (US); Sri Ramanathan, Lutz, FL (US); Matthew A. Terry, Celebration, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/474,087

(22) Filed: May 17, 2012

(65) Prior Publication Data

US 2012/0230478 A1 Sep. 13, 2012

Related U.S. Application Data

(63) Continuation of application No. 12/392,134, filed on Feb. 25, 2009, now Pat. No. 8,265,239.

(51) Int. Cl.
| H04M 1/64 | (2006.01) |
| H04M 3/42 | (2006.01) |
| H04M 11/00 | (2006.01) |
| H04B 7/14 | (2006.01) |
| H04M 3/533 | (2006.01) |

(52) U.S. Cl.
CPC ...... H04M 3/53391 (2013.01); H04M 3/42374 (2013.01)
USPC ............... 379/88.19; 379/88.16; 379/88.22; 379/201.07; 455/445; 704/270.1

(58) Field of Classification Search
CPC .................. H04M 3/42374; H04M 3/53391
USPC ............... 379/88.19, 88.22, 88.16, 201.07; 455/445; 704/270.1
See application file for complete search history.

(56) References Cited

U.S. PATENT DOCUMENTS

| 5,999,595 | A  | 12/1999 | Shaffer et al. |
| 6,393,288 | B1 | 5/2002  | Sollee et al. |
| 6,459,774 | B1 | 10/2002 | Ball et al. |
| 6,865,259 | B1 | 3/2005  | Shaffer et al. |
| 6,970,553 | B1 | 11/2005 | Gao et al. |

(Continued)

FOREIGN PATENT DOCUMENTS

| EP | 1519552    | 3/2005  |
| WO | 2006036356 | 4/2006  |
| WO | 2006135591 | 12/2006 |

OTHER PUBLICATIONS http://www.springerlink.com/content/j62767886814j725/, printed Jan. 19, 2009, 2 pages.

(Continued)

*Primary Examiner* — Gerald Gauthier
(74) *Attorney, Agent, or Firm* — Matthew Chung; Roberts Mlotkowski Safran & Cole, P.C.

(57) ABSTRACT

An architecture and method of voicemail based on session initiated protocol presence and location information of a callee is disclosed. A method of providing voicemail includes determining a location and a presence of a callee, and playing a customized voicemail greeting to a caller based on preferences defined by the callee and also based on at least one of the location and the presence.

20 Claims, 6 Drawing Sheets

(56) References Cited

U.S. PATENT DOCUMENTS

| | | |
|---|---|---|
| 6,985,561 B2 | 1/2006 | Gilbert et al. |
| 6,996,212 B1 | 2/2006 | Baker et al. |
| 7,076,043 B2 | 7/2006 | Curbow et al. |
| 7,162,237 B1 | 1/2007 | Silver et al. |
| 7,298,833 B2 | 11/2007 | Klein et al. |
| 7,330,721 B2 | 2/2008 | Bhatia et al. |
| 7,359,496 B2 * | 4/2008 | Qian et al. ............... 379/201.07 |
| 7,542,558 B2 | 6/2009 | Klein et al. |
| 7,571,249 B2 | 8/2009 | Wu |
| 7,620,160 B2 | 11/2009 | Tidwell et al. |
| 8,023,630 B2 | 9/2011 | McClung |
| 8,054,961 B2 | 11/2011 | Skubnik et al. |
| 8,086,223 B2 | 12/2011 | Allen |
| 8,131,556 B2 * | 3/2012 | Barton et al. ............... 704/270.1 |
| 8,265,239 B2 * | 9/2012 | Narayan et al. ............ 379/88.19 |
| 2003/0041048 A1 | 2/2003 | Balasuriya |
| 2003/0135569 A1 | 7/2003 | Khakoo et al. |
| 2005/0070254 A1 | 3/2005 | Boyer et al. |
| 2005/0129191 A1 | 6/2005 | Kokko et al. |
| 2005/0195954 A1 | 9/2005 | Klein et al. |
| 2006/0023658 A1 | 2/2006 | Phillips et al. |
| 2006/0072715 A1 | 4/2006 | Michael et al. |
| 2006/0210032 A1 | 9/2006 | Grech et al. |
| 2006/0291629 A1 | 12/2006 | Esh et al. |
| 2007/0004389 A1 | 1/2007 | Wallace et al. |
| 2007/0025530 A1 | 2/2007 | Tidwell et al. |
| 2007/0026852 A1 | 2/2007 | Logan et al. |
| 2007/0032222 A1 | 2/2007 | Koch |
| 2007/0081640 A1 | 4/2007 | Jachner |
| 2007/0121911 A1 | 5/2007 | Baudino et al. |
| 2007/0135036 A1 | 6/2007 | Badt |
| 2007/0165554 A1 | 7/2007 | Jefferson et al. |
| 2007/0241923 A1 | 10/2007 | Rothacker |
| 2007/0258567 A1 | 11/2007 | Koch |
| 2007/0266077 A1 | 11/2007 | Wengrovitz |
| 2008/0069318 A1 | 3/2008 | McClung |
| 2008/0086564 A1 | 4/2008 | Putman et al. |
| 2009/0022285 A1 | 1/2009 | Swanburg et al. |
| 2009/0059897 A1 | 3/2009 | Anantharaman et al. |
| 2009/0068993 A1 | 3/2009 | Allen |
| 2009/0147937 A1 | 6/2009 | Sullhan et al. |
| 2009/0190734 A1 | 7/2009 | White et al. |
| 2009/0198652 A1 | 8/2009 | Guy et al. |
| 2009/0202051 A1 | 8/2009 | Singh et al. |
| 2009/0310769 A1 | 12/2009 | Ramakrishnan et al. |
| 2010/0046731 A1 | 2/2010 | Gisby et al. |
| 2010/0099418 A1 * | 4/2010 | Holley et al. ............... 455/445 |
| 2010/0128857 A1 * | 5/2010 | Logan ........................ 379/88.22 |
| 2010/0215157 A1 * | 8/2010 | Narayan et al. ............ 379/88.19 |
| 2011/0026688 A1 | 2/2011 | Simpson |
| 2012/0230478 A1 * | 9/2012 | Narayan et al. ............ 379/88.19 |

OTHER PUBLICATIONS

Fitzpatrick et al., "Telephone Message Customization via Active Badges", TDB v37 n4A Apr. 1994 p. 19-20, Apr. 1994, 1 page.

* cited by examiner

CALLEE CENTRIC LOCATION AND PRESENCE ENABLED VOICEMAIL USING SESSION INITIATED PROTOCOL ENABLED SIGNALING FOR IP MULTIMEDIA SUBSYSTEM NETWORKS

CROSS-REFERENCE TO RELATED APPLICATIONS

The present application is a continuation of U.S. application Ser. No. 12/392,134 filed Feb. 25, 2009, the contents of which are expressly incorporated by reference herein in their entirety.

FIELD OF THE INVENTION

The invention generally relates to a method and system of voicemail and, in particular, to an architecture and method of voicemail based on session initiated protocol presence and location information of a callee.

BACKGROUND

Faced with an increasingly difficult challenge in growing both average revenue per user (ARPU) and numbers of subscribers, network carriers are trying to develop a host of new products, services, and business models based on data services. One such service is call routing and voicemail services. While a lot of advances have been made in the Value Added Services (VAS) domain in general and voicemail technology in particular (to some extent revealed by the fact that basic voicemail services are essentially given away for free by most wireless and operators and many wire-line operators), not much has been accomplished in the callee centric control area.

Callee-centric services include presence-based interactive communication services. In such services, the callees can publish, in real time, their presence information to callers (presence watchers) subscribing to the service. For example, a message can be generated and transmitted to the caller based on the callee's presence information, but this is limited in scope. Illustratively, existing presence systems provide only limited callee presence information to the caller in a response message. Furthermore, the callee is not able to control the content of missed call response messages according to different authorities or priorities granted to the caller by the callee. That is, current presence systems do not allow a callee to provide different presence information to different callers.

Accordingly, there exists a need in the art to overcome the deficiencies and limitations described hereinabove.

SUMMARY

In a first aspect of the invention, a method of providing voicemail comprises: determining a location and a presence of a callee; and playing a customized voicemail greeting to a caller based on preferences defined by the callee and also based on at least one of the location and the presence.

In another aspect of the invention, a method of generating and playing a customized voicemail greeting to a caller comprises: determining a callee location and a callee presence; assembling predefined message portions into a customized voicemail greeting based on caller identity and at least one of: the callee location and the callee presence; and playing the customized voicemail greeting to the caller.

In another aspect of the invention, there is a computer program product comprising program code stored on a tangible storage medium. When the program code is executed on a computing device, it causes the computing device to receive from a user and store a plurality of voice XML (vXML) message portions associated with caller identities, a plurality of vXML message portions associated with geoboundaries, a plurality of vXML message portions associated with time-of-day settings, and a plurality of vXML message portions associated with presence channels. The program code also causes the computing device to construct a voicemail greeting from respective ones of each of the received and stored pluralities of vXML message portions, and play the constructed voicemail greeting to a caller.

In another aspect of the invention, there is a system for playing a customized voicemail greeting, comprising: a home subscriber server that stores a profile of a user; a presence server that determines a presence of the user and receives a location of the user from a location platform; and a voicemail platform. The voicemail platform operates to: obtain the profile from the home subscriber server, obtain the location and the presence from the presence server, and play a voicemail greeting to a caller calling the user, wherein the customized voicemail greeting is based on the profile, the location, and the presence.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
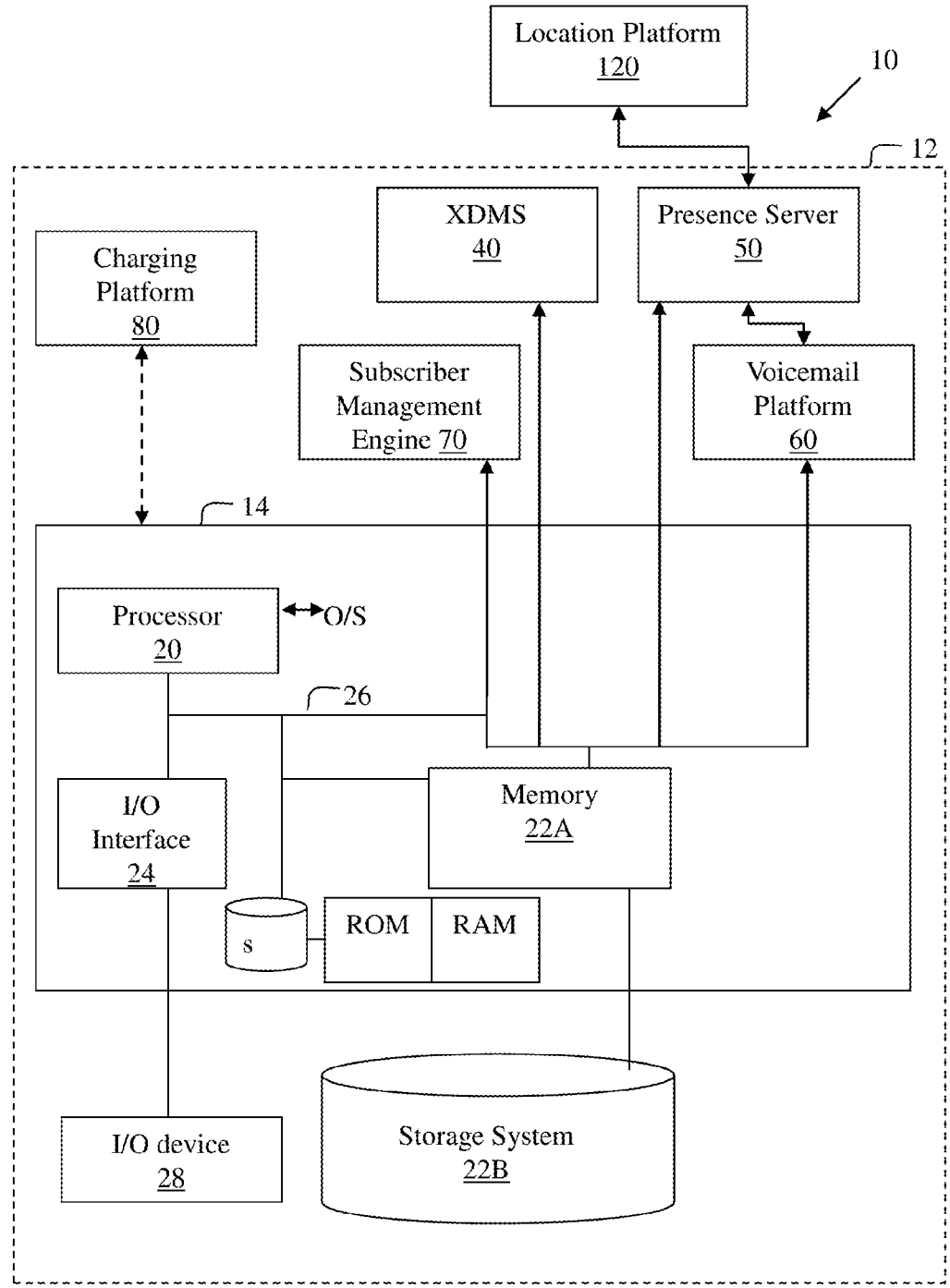
FIG. 1 shows an illustrative environment for implementing processes in accordance with the present invention.

The invention generally relates to a method and system of voicemail and, in particular, to an architecture and method of voicemail based on session initiated protocol presence and location information of a callee. Advantageously, the present invention provides a callee centric voicemail service that is enhanced by a location platform and presence server in the context of an IP multimedia subsystem network implementation in a telecommunications network. In addition, a configurable set of preferences allows callees to add specific customizable pieces of text using Voice XML (vXML).

In a first aspect of the invention, one of a plurality of predefined voicemail messages is played for a caller based upon the presence and location of the callee. In another aspect of the invention, a customized voicemail message is created and played to the caller, the customized message being based on an identity of the caller, a location of the callee, and a presence of the callee. In this manner, implementations of the invention allow for the voicemail experience to be configured by the callee in a highly personalized manner and allow for the caller to determine an immediate alternate channel of availability for the callee to subsequently use, and maybe decide against leaving a voicemail.

More specifically, the present invention focuses on allowing the customization of a voicemail greeting by the callee, on a per caller basis, based on a set of vXML controls that are used along with network provided location and presence context. The present invention provides the callee fine grained control over the dynamic creation of a context sensitive greeting that is played back to the caller, allowing for the callee to configure, for example, specific greetings on a call by call basis. This allows for subsequent caller behavior modification, including that of leaving a voicemail. Also, this allows for callee controlled based filtering on a caller by caller basis to allow, for example, two callers receiving entirely different messages or routed to different devices based on presence and location information of the callee and pertinent to that caller. In this way, the system and method of the invention is primarily callee centric, based on a set of preferences that is setup by the callee, amongst other features. The present invention is also configured to integrate seamlessly into an IMS network for routing as well as charging facilities while continuing to support callers from the Public Switched Telephone Network (PSTN).

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computing infrastructure 12 that can perform the processes described herein. In particular, the computing infrastructure 12 includes a computing device 14. The computing device 14 can be resident on a carrier network infrastructure or other third party service provider (any of which is generally represented in FIG. 1).

The computing device 14 includes or communicates with at least one session initiated protocol application server (SIP A/S), such as, for example, an XM Document Management System (XDMS) 40, presence server 50, and voicemail platform 60. The computing device 14 may also comprise or communicate with a subscriber management engine 70 and charging platform 80. The XDMS 40, presence server 50, voicemail platform 60, subscriber management engine 70, and charging platform 80 (any of which can be a module or program control) are configured to make the computing device 14 operable to perform the processes described herein.

For example, in embodiments, the XDMS 40 manages group-list information and uses XCAP as an interface primarily exposed to the presence server 50. The presence server 50 determines user presence, receives user location determined by the location platform 120, and provides the user presence and location information to the voicemail platform 60. The subscriber management engine 70 stores user-defined preferences in storage 22B. When an incoming call is sent to voicemail, the voicemail platform 60 utilizes the preferences (e.g., from storage 22B) and the presence and location information (e.g., from presence server 60) to render a customized voicemail greeting to the caller.

In the noted configuration, the XDMS 40, presence server 50, voicemail platform 60, subscriber management engine 70, and charging platform 80 can be one or more computing modules on the same or different computing infrastructure, and can be implemented by a service provider such as, for example, a network carrier as discussed in greater detail below. By using this system and methodology, the network carrier will not have to make any significant infrastructure investments, as the preexisting infrastructure is utilized with the present invention.

More specifically, the illustrative environment 10 of FIG. 1 provides a voicemail platform (e.g., voicemail platform 60) that allows for custom voicemail greeting generation and playback, and provides the following functionality, amongst others described herein.
- Allows a callee to use a palette based configuration that allows for the customization of voicemail greetings played to callees.
- Plays customized voicemail messages based on location of the callee, presence of the callee (optionally including availability on a designated communication channel), identity of the caller (e.g., via white lists), and time of day preferences.

Uses Session Initiated Protocol (SIP) based signaling to communicate as a watcher to an existing presence server implementation in the IMS network.

Leverages presentities that use location information as one of the nodes of the presence document.

Implementations of the invention provide for the customization of a voicemail greeting by the callee, on a per caller basis, based on a sophisticated set of vXML controls that are used along with network provided location and presence context. In embodiments, the location platform 120 is used to determine the location of the callee, and the location is factored in as a node of the presence document using Session Initiation Protocol enabled signaling, for seamless integration into an IP Multimedia subsystem Network. The current presence information is then factored into the dynamic generation of the greeting at runtime.

In implementations, the presence information of a callee is determined prior to a call being received. That is, presence information that is used is already present as a SIP "Notify" from the presence server 50, which is more efficient and supports scalability and higher throughputs. Embodiments also allow for an indication as to an alternate channel that the callee may be available on. For example, if the callee is at lunch, their mobile could be specified as one such alternate channel, factored into the greeting that is played. Moreover, implementations provide callee controlled based filtering on a caller by caller basis. In this manner, two callers could get entirely different messages based on location and presence information pertinent to that caller. Additionally, implementations of the invention integrate seamlessly into an IMS network for routing as well as charging facilities while continuing to support callers from the PSTN.

Aspects of the invention are primarily callee centric, focusing on the nature of the greeting that is constructed for the callee, based a set of preferences that is setup by the callee. For example, callee controlled white-lists at different levels may be leveraged to allow for fine grained callee control. Callee controlled filters may include location based on geoboundaries, and presence on multiple channels including XMPP supported public IM gateways. Preference controls may also include time of day controls and caller identity based customizations. In embodiments, there are visual palette driven controls that allow easy insertion of vXML clips into the greeting. Moreover, integration is supported via SIP into existing IMS platform components, and connectivity to a PSTN via a BCGF, and charging is supported via diameter to an IMS CCF.

In embodiments, the illustrative environment uses callee location and presence to drive the dynamic creation of a custom greeting to callers. Callee controlled filters determine which callers get exposure to geo-boundary specified location, presence and time of day preferences. Moreover, SIP signaling drives location information as well, allowing location information to be one of the nodes in the presence document. In this manner, implementations of the invention provide for seamless integration as a SIP Application Server in an existing IMS network, with the necessary tie points to the PSTN.

In embodiments, there is provided a unique way of controlling a voicemail greeting based on the identity of the caller, but controlled largely by the callee. Fine grained callee control allows for selective use of presence and location information, allowing the caller to make alternate channel decisions on the fly. Moreover, integration with SIP based IMS infrastructure allows for implementation in an IMS core network as a revenue generating service.

According to aspects of the invention, there is a callee configured and controlled mechanism of generating custom greetings to callers who can then take subsequent actions, including that of leaving a message. Geo-boundaries may be used to drive location based message control. Moreover, the presence integration implemented in embodiments is callee focused and uses a telecommunications network housed presence platform 120 that is plugged into multiple presence sources, both from inside the telecommunications network as well as external sources such as a public SMPP based Instant Messaging Gateway. In this manner, implementations of the invention provide for highly innovative integration into an IP Multimedia subsystem platform. Also, geo-boundary driven location publication is supported as part of a presence document, allowing for more efficient integration and abstraction of the actual location platform exposed protocol (example Open LS).

In accordance with even further aspects of the invention, there is a voicemail based set of customizations that allows callees to significantly customize greetings that are played to callers based on rich context, including location and presence. Fine grained control allows a callee to specify specific actions and rules to be applied to each caller on a case by case basis. In embodiments, implementations of the invention operate primarily in the context of an IP Multimedia subsystem network, while supporting callers who are part of the regular PSTN. Moreover, implementations provide support for flexible charging model support via an IMS compliant CCF. This allows for the flexible application of charging models by downstream mediation, rating, billing and settlement platforms to support the full breadth of business models. Additionally, a callee interface allows for a palette based control of vXML snippet insertion into the message.

In embodiments, implementations of the invention allow a callee to configure specific greetings on a caller by caller basis, independent of sub folders. This gives the callee fine grained control over the dynamic creation of a context sensitive greeting that is played back to the caller, allowing for subsequent caller behavior modification, including that of leaving a generic voicemail. Implementations may use a location based geo-boundary definition based on triggered notification to provide location based customizations. Additionally, implementations may use a telecommunications network (or other) presence platform via SIP signaling to control presence information including integration to external presence sources such as a public IM gateway (using XMPP), as well as integration to known presence sources inside the core telecommunications network.

In further embodiments, the voicemail generation is caller identification driven, as opposed to general purpose. For example, every caller could be designated (e.g., in a white list) as one that is processed according to a set of rules. Voicemail greetings that are played may be subject to fine grained control that takes into account presence and location of the callee, instead of the caller. Active location determination may be based on the capabilities of a network housed location platform 120, and the location information may be integrated into a presence document using an existing standard. In this manner, implementations of the invention provide for the generation of a customized greeting that is rendered to the caller on a callee by callee basis. Moreover, there may be a subscriber controlled UI to associate vXML pieces with specific cotext factors (location, presence, caller information, etc.). Additionally, charging may be accounted for in an IMs context.

In even further embodiments, implementations of the invention are primarily callee centric, focusing on the nature of the greeting that is constructed for the callee, based a set of preferences that is setup by the callee. In embodiments, default routing semantics are relied on. Callee controlled white-lists at different levels may be leveraged to allow for fine grained callee control. Moreover, callee controlled filters include location based on geoboundaries, and presence on multiple channels include XMPP supported public IM gateways. Preference controls may also include time of day controls and caller identity based customizations. Implementations may employ visual palette driven controls that allow easy insertion of vXML clips into the greeting. In embodiments, integration is supported via SIP into existing IMS platform components, and connectivity to a PSTN via a BCGF, while charging is supported via diameter to an IMS CCF.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices on the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or location based service provider, could offer to perform the processes described herein. In this case, the service provider can create, maintain, deploy, support, etc., the computer infrastructure that performs the process steps of the invention for one or more customers. The customers may be, for example, a mobile user or a third party requesting information about the location and/or route of the mobile user. In return, the service provider can receive payment from the customer(s) under a subscription and/or fee agreement and/or the service provider can receive payment from the sale of advertising content to one or more third parties.

Exemplary Architecture

Figure 2:
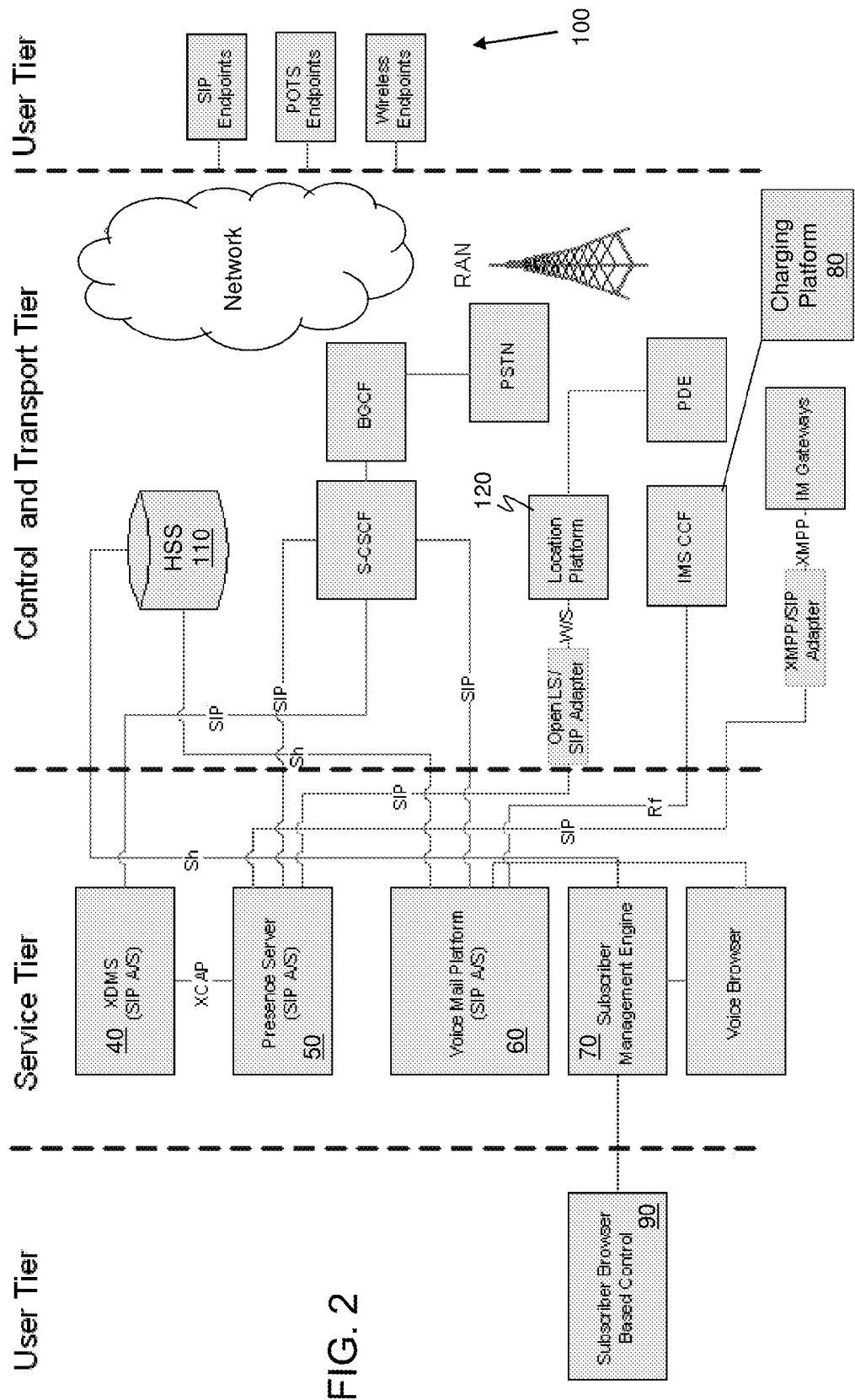
FIG. 2 shows an exemplary architecture implementing aspects of the present invention.

FIG. 2 shows an exemplary architecture in accordance with aspects of the invention. In particular, FIG. 2 shows a User Tier in which a subscriber (e.g., user, callee) may set up their preferences via a subscriber browser-based control 90, as described herein. The User Tier is also depicted on the right side of FIG. 2 as including different types of endpoints 100 (e.g., SIP, POTS, and Wireless endpoints) that are connected to the architecture and are used in the call flow to make and receive calls that trigger the processes described herein.

In embodiments, the Service Tier includes the XDMS 40, presence server 50, voicemail platform 60, and subscriber management engine 70 that operate to perform the processes described herein. In embodiments, the XDMS 40 manages group-list information and uses XCAP as an interface primarily exposed to the presence server 50. Additionally in this tier, the voicemail platform 60 supports SIP based interfaces to the presence server 50 via the Serving-CSCF (S-CSCF), in the Control and Transport Tier.

In embodiments, the Control and Transport Tier includes other core elements of the IMS core network including the Home Subscriber Server (HSS) 110 for storing subscriber profile information and exposed via the Sh interface to the management engine 70 in the Service Tier. The Serving CSCF (S-CSCF), the Interrogating CSCF (I-CSCF) and the Proxy CSCF (P-CSCF) are also included in the Control and Transport Tier, along with the required Media Gateways, Media Resource Functions (MRF) and the Breakout Gateway Control Function (BGCF) to the PSTN. In embodiments, the Control and Transport Tier also includes the charging platform 80 and a location platform 120, described herein.

Advantageously, in embodiments, the subscriber (e.g., user, callee) may utilize the subscriber browser based control 90 to input and manage preferences that are stored in a profile in the HSS 110 (e.g., via the subscriber management engine 70). The preferences may include, but are not limited to: caller white lists, geoboundaries, time of day settings, calendar identifications, presence channels, logical rules based on presence values and/or location values, predefined customized vXML greetings, vXML message portions for dynamic construction of messages, other custom components, etc., as described herein. In embodiments, HSS updates are sent from the HSS 110 to the voicemail platform 60 (e.g., via the Sh protocol) so that its runtime cache is properly populated with preference and configuration changes and/or settings. Moreover, HSS changes cause specific subscribes to be sent to the presence server 50, which in turn may generate subscribes to the location platform adapter. In this way, the voicemail platform 50 has access to the preferences stored in the profile in the HSS 110, and can create customized greetings based at least partly on these preferences.

In embodiments, the voicemail platform 60 also takes into account the current location and/or presence of the subscriber (e.g., user, callee) when creating a customized voicemail greeting to play to a caller. The subscriber location may be obtained using the location platform 120, and the subscriber presence may be obtained using the presence server 50. More specifically, still referring to FIG. 2, the location platform 120 may be based on Bluetooth technology, GPS, A-GPS, or triangulation methodologies, all of which are known to those of skill in the art such that further explanation is not believed necessary. The location platform 120 uses an Open LS to SIP adapter to send location messages (e.g., a geo-boundary was crossed) to the presence server 50. In this manner, the computing device 14 can factor in location as a node of the presence document in the presence server 50 using SIP enabled signaling for seamless integration into an IP Multimedia subsystem network. The presence server 50 sends notifications (e.g., SIP Notify) to the voicemail platform 60 as appropriate. In embodiments, the presence server 50 only sends changes to the voicemail platform 60, instead of sending the entire presence document, to provide further optimization.

Accordingly, as described with respect to FIGS. 1 and 2, the voicemail platform 60 has access to the subscriber preferences (e.g., from the HSS 110), and also the subscriber location and presence (e.g., from the location platform 120 and presence server 50). In embodiments, when a call from a caller comes in, the voicemail platform goes through appropriate steps to customize a greeting. More specifically, when an incoming call from a caller goes to voicemail, the voicemail platform 60 utilizes information from the HSS 110, location platform 120, and presence server 50 to play a customized greeting to the caller using the location, presence, and preferences of the callee. The customized greeting may be based on, for example, the callee's location and/or presence, caller identity, date, time of day, etc. In this manner, implementations of the invention provide an efficient way to integrate a presence server 50, location platform 120, and voicemail platform 60 to provide customized voicemails to a caller on a call by call basis.

In embodiment, the preferences stored in the HSS 110 allow for different levels of granularity such as, for example, time of day controls, caller identity based customizations, caller greetings based on user (e.g., callee) location information, as well as presence on multiple channels that include Extensible Messaging and Presence Protocol (XMPP) supported public IM gateways. It is thus contemplated by use of the callee set and managed preferences that a specific caller or set of callers can be processed according to geo-boundary specified location, presence and time of day preferences, etc. according to a set of callee defined rules.

In accordance with aspects of the invention, the subscriber sets and manages the preferences using visual palette driven controls which allow easy insertion of vXML clips into the greeting, for example. These visual palette driven controls can be provided on the I/O device of any general purpose computing device (e.g., cellular telephone, smart phone, personal digital assistant, laptop computer, notebook computer, desktop computer, workstation, etc.). The I/O device can be, for example, any device that enables an individual to interact with the computing device 14 or any device that enables the computing device 14 to communicate with one or more other computing devices using any type of communications link. In embodiments, the visual palette driven control is presented to the subscriber via the subscriber browser based control 90.

In embodiments, the illustrative environment can use SIP signaling to control presence information including the integration to external presence sources such as a public IM gateway (using Extensible Messaging and Presence Protocol (XMPP)). Moreover, there may be integration to known presence sources inside the core telecommunications network, e.g., connectivity to a public switched telephone network (PSTN) via a Breakout Gateway Control Function (BCGF).

Still referring to FIG. 2, in yet another embodiment, the system and method provides a charging platform 80 to provide charging models for services rendered. The charging platform 80 may be maintained, deployed, created and/or serviced by the service provider. The charging platform 80 is designed to generate a charging record for services rendered to a subscriber, e.g., the callee will be charged for the services rendered based on the charging model implemented by the system and method of the invention. In embodiments, the service provider can calculate an amount to be charged, based on many different considerations and generate the charging record to be sent to the charging platform 80. In turn, the charging platform 80 can generate an invoice and/or deduct a usage charge from an account of the subscriber (callee). The charging platform 80 also supports flexible charging models supported via an IMS compliant Customer Care Framework (CCF). This allows for the flexible application of charging models by downstream mediation, rating, billing and settlement platforms to support the full breadth of business models.

Exemplary Operation

Still referring to FIG. 2, in embodiments, the user employs the subscriber browser based control 90 to set and manage preferences that will be used to generate customized voicemail greeting on a caller by caller basis. The subscriber browser based control 90 may comprise a palette based graphical user interface (GUI) (such as I/O device 28 of FIG. 1) that permits a user to associate pieces of text (via vXML) with specific context elements. The user-defined preferences are saved in a user profile in the HSS 110 (e.g., storage system 22B) and are used by the voicemail platform 60, in conjunction with the user presence and location data, to generate and play a customized voicemail greeting to a caller.

For example, in embodiments, the user's location is determined by the location platform 120 in a known manner, and the user's presence is determined by the presence server 50 in a known manner. The user's location and presence are communicated to the voicemail platform 60 via the presence server 50. The voicemail platform 60 also has access to the user-defined preferences stored in the HSS 110. When the callee receives a call from a caller, the voicemail platform 60 compares the user presence and location data (from the presence server 50) to the preferences (stored in the HSS 110) and, based upon user-defined associations, generates and plays a customized voicemail greeting to the caller.

In accordance with a first aspect of the invention, the preferences stored in the HSS 110 include, but are not limited to: presence values, location values, rules, and predefined greetings. For example, exemplary presence values that a user may set and manage in their profile include: "In a Meeting," "On the Phone," "At Lunch," "Do Not Disturb," and "Traveling." These values may be associated with particular conditions (e.g., contexts) recognized by the presence server 50. For example, the "In a Meeting" value may be associated with a manual setting of the user's device (e.g., phone, PDA, etc.) or with an electronic calendar (e.g., date and time of day), both of which are observable (e.g., detectable, accessible, etc.) by the presence server 50. Similarly, the "On the Phone" value may be associated with an operating status of the user's telephone that is observable by the presence server 50. Likewise, the "At Lunch" value may be associated with manual setting of the user's device or with a predefined time of day, both of which are observable by the presence server 50. In a similar manner, the "Do Not Disturb" value may be associated with manual setting of the user's device that is observable by the presence server 50. Also, the "Traveling" value may be manually set or synchronized with an electronic calendar or out-of-office agent that is observable by the presence server 50.

Location values may also be defined by the user and stored in the user profile in the HSS 110 (e.g., using the subscriber browser based control 90). For example, the user may define the location value "Atlanta Work" as associated with a geographic area defined by a first set of geoboundaries. Similarly, the user may define the location value "New York Work" as associated with a second geographic area defined by as second set of geoboundaries. Likewise, the user may define the location value "Home" as associated with a third geographic area defined by a third set of geoboundaries. Although specific examples of presence values and location values are shown, the invention is not limited to these values. Rather, any suitable presence values and location values may be defined by the user in their profile.

Rules may also be defined by the user and stored in the user profile in the HSS 110 (e.g., using the subscriber browser based control 90). For example, Table 1 lists exemplary rules that may be defined in the user profile, the rules being based upon the above-noted presence values and location values.

TABLE 1

| Rule No. | Rule |
| --- | --- |
| 1 | If [Presence = In a Meeting] and [Location = Atlanta Work], then play {Greeting 1} |
| 2 | If [Presence = In a Meeting] and [Location = New York Work], then play {Greeting 2} |
| 3 | If [Presence = Traveling], then play {Greeting 3} |
| 4 | If [Presence = Do Not Disturb], then play {Greeting 4} |

Greetings may also be defined by the user and stored in the user profile in the HSS 110 (e.g., using the subscriber browser based control 90). For example, Table 2 lists exemplary greetings (defined using vXML) that may be defined in the user profile, one of which will be played to a caller based upon the above-noted rules.

TABLE 2

| Greeting No. | Greeting (vXML) |
| --- | --- |
| Greeting 1 | "You have reached John Doe. I'm working from the Atlanta Office today, but am currently in a meeting. I'll return your call shortly." |
| Greeting 2 | "You have reached John Doe. I'm working from the New York Office today, but am currently in a meeting. I'll return your call shortly." |
| Greeting 3 | "This is John Doe. I am currently traveling on business, and will return your call when I return to the office." |
| Greeting 4 | "This is John Doe and I'm unable to answer my phone at the moment. Please leave a message." |

In embodiments, the user-defined presence values and location values are stored in the HSS 110 and utilized by the voicemail platform 60, in conjunction with data from the presence server 50 (which includes data from the location platform 120), to generate a greeting to be played to a caller. Accordingly, in embodiments, when the callee receives a call from a caller, the voicemail platform 60 accesses the current callee presence and location (from the presence server 50) and the callee profile (from the HSS 110). Based upon the callee's current presence and location, and upon presence values and/or location values defined in the callee profile, the voicemail platform 60 determines whether a rule is satisfied. If a rule is satisfied, then a particular greeting associated with the rule is played to the caller. If no rule is satisfied, then a default greeting is played to the caller. In this manner, one of a plurality of customized voicemails may be played to the caller based upon the callee's current presence and location.

In accordance with a second aspect of the invention, rather than playing a pre-defined customized greeting, the voicemail platform 60 constructs a customized greeting at the time of the incoming call. In this embodiment, the user profile stored in the HSS 110 may include location values, presence values, one or more white lists, and callee communication channels. In this manner, when the callee receives an incoming call from the caller, the voicemail platform 60 constructs a customized greeting based upon the callee's current location and presence, the caller identity, and alternate communication channel(s) that the callee might be reached on. In particular, the user may define a plurality of different vXML building blocks associated with different presence, location, caller identity, and time of day settings, such that when an incoming call goes to voicemail the voicemail platform dynamically constructs a greeting for the caller by assembling selected ones of the building blocks.

More specifically, the user may utilize the subscriber browser based control 90 to associate a vXML message with a caller identity in a white list, which is part of the user profile stored in the HSS 110. For example, the user may define his or her preferences to associate the vXML message "Hi Joe" with telephone number "555-555-1234." Similarly, the user may define his or her preferences to associate the vXML message "Hello Dear" with SIP Uniform Resource Identifier (SIP URI) "sip:x@y:Port."

Also, the user may utilize the subscriber browser based control 90 to associate vXML messages with presence values. For example, the presence value "In a Meeting" (described above) may be associated with the vXML message "in a meeting now." Similarly, the presence value "On the Phone" (described above) may be associated with the vXML message "on the phone now." Likewise, the presence value "At lunch" (described above) may be associated with the vXML message "at lunch now."

Moreover, the user may utilize the subscriber browser based control 90 to associate a vXML message with a location value. For example, the location value "Atlanta Work" (described above) may be associated with the vXML message "in the Atlanta office." Similarly, the location value "New York Work" (described above) may be associated with the vXML message "in the New York office."

Additionally, the user may utilize the subscriber browser based control 90 to associate a vXML message with the user's alternate communication channels that are observable by the presence server 50. For example, the user may own a mobile device, an office phone, and one or more instant messaging and/or chat accounts. In embodiments, the user can define vXML messages associated with each communication channel such that when a caller calls, the voicemail platform 60 can tell the caller to try another channel (if the channel is determined as open by the presence server 50).

For example, the user may define his or her preferences to associate the vXML message "message me on YZ messenger" with YZ Messenger ID "user 4343@yz.com." Similarly, the user may define his or her preferences to associate the vXML message "message me on GHItalk" with GHItalk ID "user 4343@ghimail.com," and the vXML message "message me on ABC IM" with ABC ID "user 4343@abc.com." In these examples, "YZ," "GHI," and "ABC" are generic exemplary names; however, it is understood that implementations of the invention can be used with any conventional instant messaging and/or chatting services with which the user has a possible presence.

Accordingly, when a callee receives an incoming call from a caller, the voicemail platform accesses the callee's current presence and location, and accesses the callee profile stored in the HSS 110, and constructs a greeting from the associated vXML messages. For example, when the incoming call is from telephone number "555-555-1234," the callee's location is within the geoboundary defining the Atlanta Office, the callee's electronic calendar indicates a meeting at this date and time, and the callee is logged on to ABC, the voicemail platform will construct and play the following message to the caller: "Hi Joe, I am in the Atlanta office and am in a meeting now, but you can message me on ABC IM."

Figure 3:
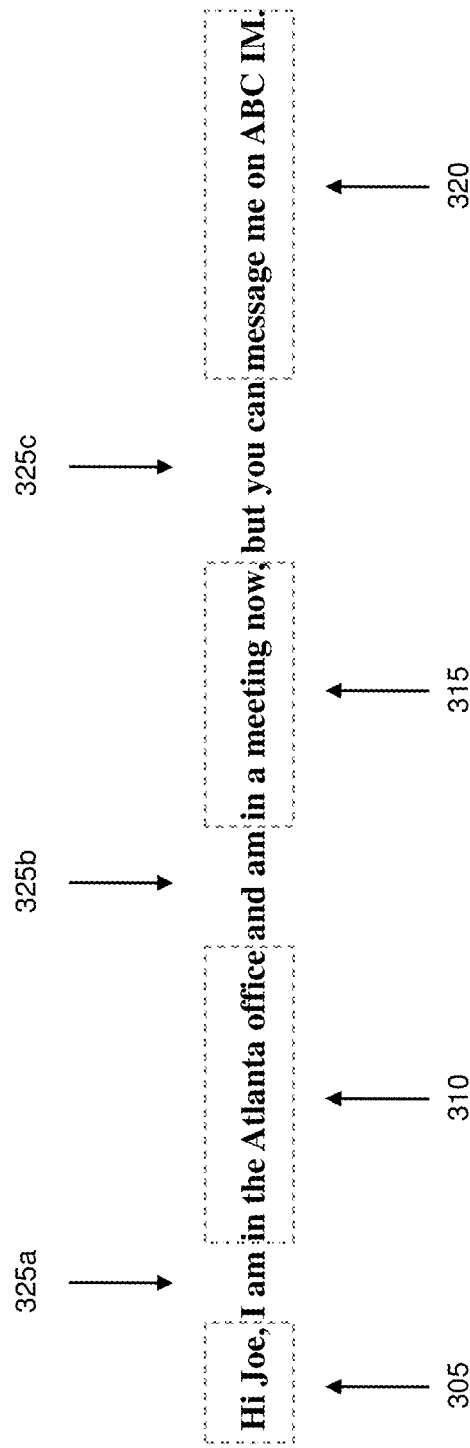
FIG. 3 shows an exemplary constructed message according to aspects of the present invention.

FIG. 3 shows an exemplary constructed vXML message in accordance with aspects of the invention. Portion 305 is a vXML message associated with a caller identity, as defined in a white list in the user profile stored in the HSS 110. Portion 310 is a vXML message associated with the callee location, determined by the location platform 120 and communicated to the voicemail platform via the presence server 50. Portion 315 is a vXML message associated with the callee presence value, determined by the presence server 50. Portion 320 is a vXML message associated with the callee presence (e.g., availability on alternative communication channels) determined by the presence server 50. Portions 325*a-c* are vXML messages that form a skeleton into which portions 305, 310, 315, and 320 are inserted to create a coherent message.

Accordingly, in embodiments, when an incoming call is received, the voicemail platform 60 gathers data from the presence server 50 and the HSS 110, and constructs and plays a customized voicemail greeting for the caller. The invention is not limited to the portions 305, 310, 315, 320, and 325*a-c* described, but rather, any suitable vXML messages may be used within the scope of the invention.

Exemplary Processes

Figure 4:
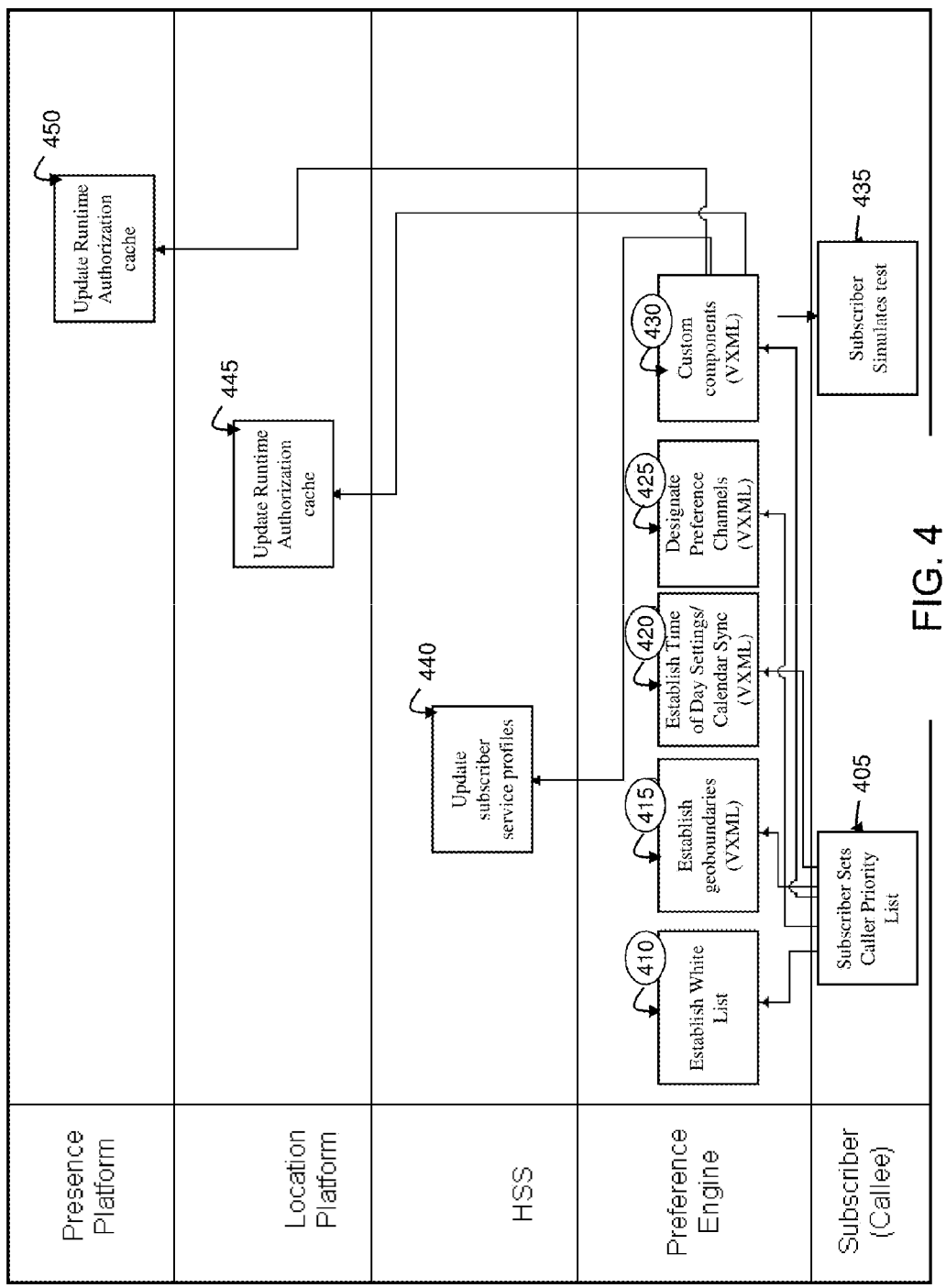
FIGS. 4-6 are flow diagrams showing a process in accordance with aspects of the present invention.
Figure 5:
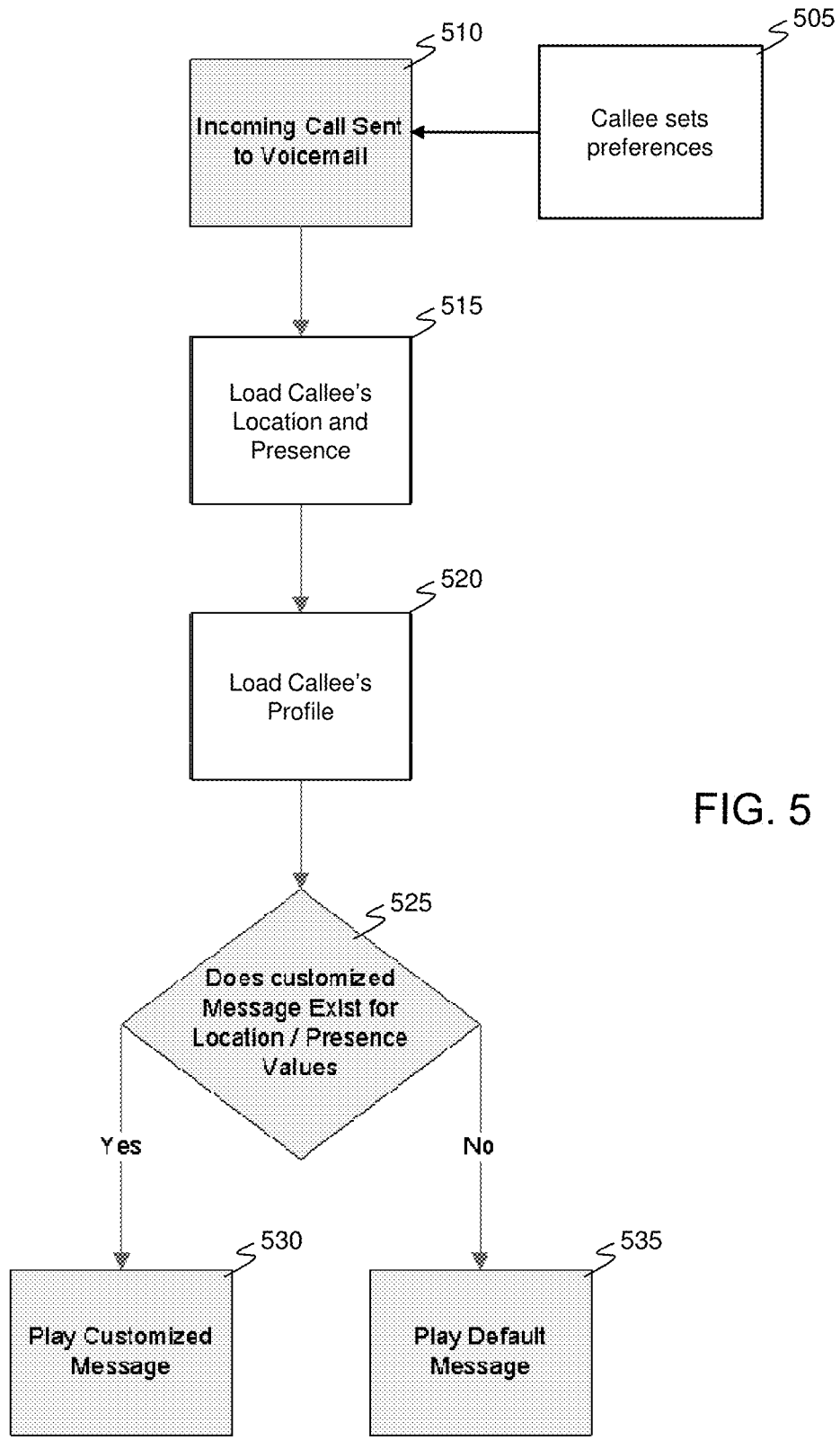
Figure 6:
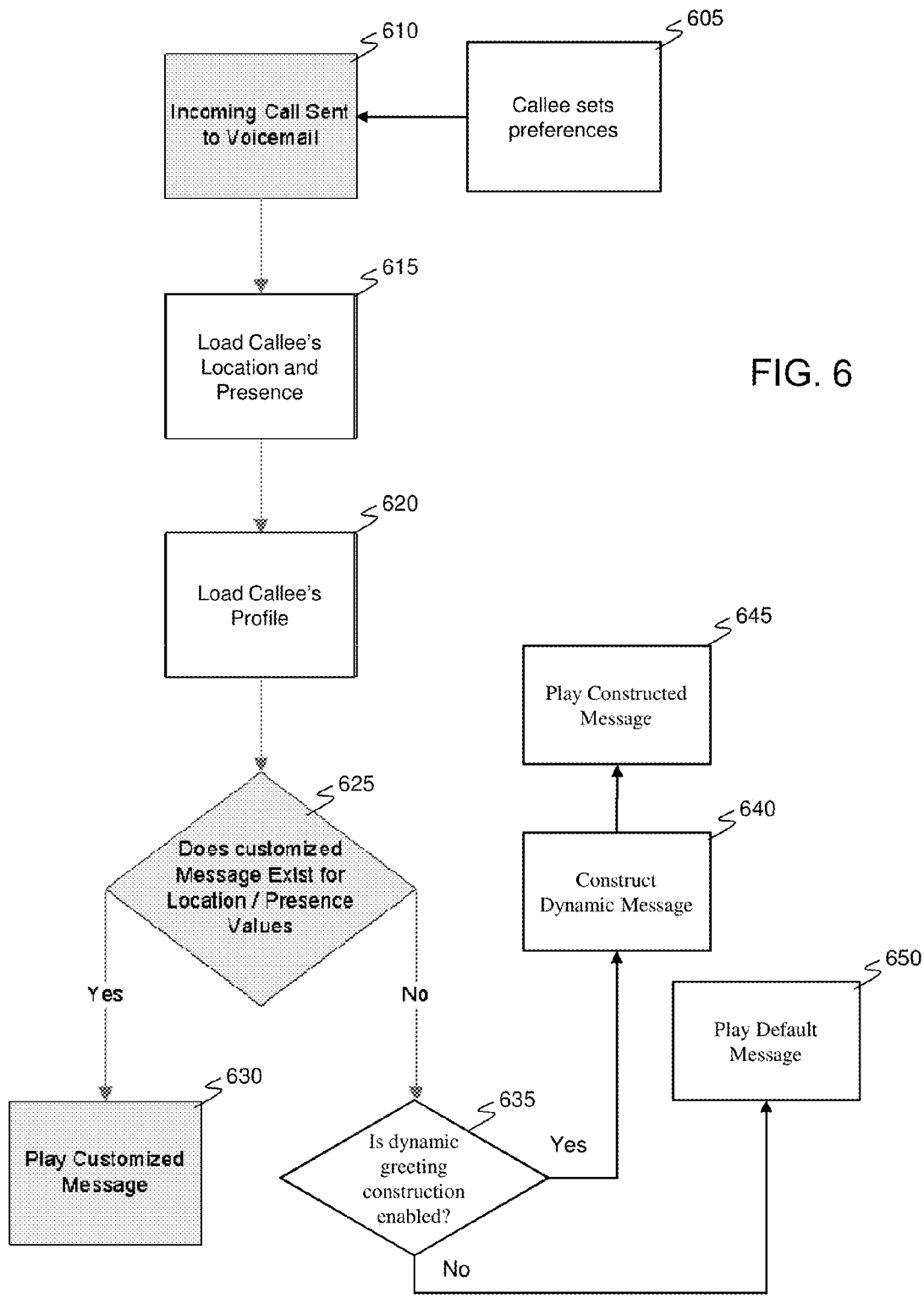

FIGS. 4-6 illustrate exemplary processes in accordance with the present invention. The steps of FIGS. 4-6 may be implemented on the computer infrastructure of FIG. 1 and/or the architecture of FIG. 2, for example. The flow or swim lane diagrams in FIGS. 4-6 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations, can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 4 shows a subscription provisioning flow according to aspects of the invention. More specifically, at step 405 the subscriber (e.g., user, callee) sets up the caller priority list. In embodiments, this includes the subscriber utilizing an I/O device (e.g., the subscriber browser based control 90) to define preferences that are saved as a profile in a data store (e.g., the HSS 110), as further described with respect to steps 410, 415, 420, 425, and 430 below.

At step 410, the subscriber utilizes the subscriber browser based control to establish (e.g., define) white lists, such as, for example, a list of caller identities based on telephone number and/or SIP URI. This may be performed as described above with respect to FIGS. 1-3. Step 410 may also include defining and associating vXML message portions with the individuals listed in the white list(s).

At step 415, the subscriber utilizes the subscriber browser based control to establish (e.g., define) geoboundaries. This may be performed as described above with respect to FIGS. 1-3. For example, in embodiments, this may comprise defining geoboundaries that define location values. Step 415 may also include defining and associating vXML message portions with the geoboundaries, or with the presence values associated therewith.

At step 420, the subscriber utilizes the subscriber browser based control to establish (e.g., define) time of day settings and/or calendar synchronization. This may be performed as described above with respect to FIGS. 1-3. For example, in embodiments, this may comprise associating a presence value with a date and time. In further embodiments, this may comprise identifying an electronic calendar (e.g., of the subscriber) that can be accessed by the voicemail platform, and associating presence values with portions of the calendar. Step 420 may also include defining and associating vXML message portions with the time of day settings and/or calendar, or with the presence values associated therewith.

At step 425, the subscriber utilizes the subscriber browser based control to designate (e.g., define) presence channels. This may be performed as described above with respect to FIGS. 1-3. For example, in embodiments, this may comprise identifying usernames of alternative communication channels that the presence server may detect the callee's availability on. Step 425 may also include defining and associating vXML message portions with the presence channels.

At step 430, the subscriber utilizes the subscriber browser based control to define other custom components. This may be performed as described above with respect to FIGS. 1-3. For example, in embodiments, this may comprise defining skeleton message portions (e.g., via vXML). Step 430 may also include defining a default message via vXML to be played when neither a customized message nor a constructed message is appropriate. Step 430 may also comprise defining rules based on other preferences defined in the profile, and defining and associating predefined customized greetings with the rules.

At step 435, the subscriber may simulate (e.g., test) the preferences defined in the profile. For example, the subscriber may choose an option presented by the subscriber browser based control that allows the subscriber to listen to any one of the predefined customized greetings, an exemplary constructed greeting, or a default greeting.

At step 440, the system (e.g., computing device 14) updates the subscriber profile (stored in the HSS 110) based on the data received in steps 410, 415, 420, 425, and 430. At steps 445 and 450, the system (e.g., computing device 14) updates the runtime authorization cache of both the location platform and the presence server, if appropriate, based upon any updated location and presence information entered by the subscriber in any of steps 410, 415, 420, 425, and 430.

FIG. 5 depicts a method of playing a predefined voicemail greeting to a caller based upon the callee's presence and location according to aspects of the invention. More specifically, at step 505 a user (e.g., subscriber, callee, etc.) sets up his or her profile using an I/O device (e.g., the subscriber browser based control 90) to define preferences that are saved in a data store (e.g., the HSS 110). This may be performed in a manner described above with respect to FIG. 2. The preferences may include, but are not limited to, presence values, location values, rules based on one of presence values and location values, customized greetings (e.g., vXML) associated with the rules, and a default greeting (e.g., vXML).

At step 510, an incoming call that the callee does not answer is sent to the callee voicemail in a conventional manner. At step 515, the voicemail platform (e.g., voicemail platform 60) loads the callee's current location and presence from the presence server (e.g., presence server 50, which subscribes to location platform 120). At step 520, the voicemail platform loads the callee's profile from the storage (e.g., HSS 110). Steps 510, 515 and 520 may be performed in the manner described above with respect to FIG. 2.

At step 525, the voicemail platform utilizes the information from steps 515 and 520 to determine whether a customized greeting exists for the callee's current presence value and/or location value. In embodiments, this is performed by examining rules stored in the user profile, as described above. If a customized greeting is associated with the current presence value and/or location value of the callee, then at step 530 the voicemail platform communicates the customized greeting to the caller. If, on the other hand, a customized greeting does not exist for the current presence value and/or location value of the callee, then at step 535 the voicemail platform communicates the default greeting to the caller.

In this manner, implementations of the invention allow a user to set up a profile based on location values and presence values, and to define rules and customized greetings in the profile. When an incoming call is sent to voicemail, the callee's current presence and location are determined. One of a plurality of predefined customized greetings is selected and played to the caller based upon the callee's current location and presence, and also upon the profile. Otherwise, a default greeting is played to the caller.

FIG. 6 depicts a method of constructing a customized voicemail greeting according to aspects of the invention. Steps 605, 610, 615, 620, 625, and 630 may be performed in a manner similar to steps 505, 510, 515, 520, 525, and 530 described above with respect to FIG. 5. For example, at step 605, a user (e.g., subscriber, callee, etc.) sets up his or her profile using an I/O device (e.g., the subscriber browser based control 90) to define preferences that are saved in a data store (e.g., the HSS 110). The preferences may include, but are not limited to, presence values, location values, rules based on one of presence values and location values, customized greetings (e.g., vXML) associated with the rules, and a default greeting (e.g., vXML). The preferences may additionally include white lists and alternate communication channels. The preferences may further include vXML message portions associated with each presence value, location value, white list entry, and alternate communication channel (e.g., as described above with respect to FIG. 3).

At step 610, an incoming call that the callee does not answer is sent to voicemail. At step 615, the voicemail platform (e.g., voicemail platform 60) loads the callee's current location and presence from the presence server (e.g., presence server 50, which subscribes to location platform 120). At step 620, the voicemail platform loads the callee's profile from the storage (e.g., HSS 110). At step 625, the voicemail platform utilizes the information from steps 615 and 620 to determine whether a customized greeting exists for the callee's current presence value and/or location value. If a customized greeting is associated with the current presence value and/or location value of the callee, then at step 630 the voicemail platform communicates the customized greeting to the caller.

If, on the other hand, a customized greeting does not exist for the current presence value and/or location value of the callee, then at step 635 the voicemail platform determines whether dynamic greeting construction is enabled. In embodiments, this may be performed by, for example, examining data in the user profile that indicates whether the user has enabled and set up for the construction of greetings.

If dynamic greeting construction is enabled, then at step 640 the voicemail platform constructs a dynamic message from vXML message portions stored in the user profile. This may be performed, for example, as described above with respect to FIG. 3. For example, in embodiments, the voicemail platform determines which vXML message portions to use in the constructed message based upon at least one of: the identity of the caller (e.g., via white list); callee presence; callee location; date and/or time of day (e.g., based on the callee's calendar); and the callee's alternate channels of communication.

At step 645, the constructed message is played to the caller (e.g., by the voicemail platform). If, dynamic greeting construction is not enabled at step 635, then the process proceeds to step 650, where a default message is played to the caller.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method of providing voicemail, comprising:
    obtaining, by at least one computer device, a location and a presence of a callee;
    determining, by the least one computer device, whether dynamic greeting construction is enabled by the callee, wherein the determining is based upon a callee receiving a call from a caller; and
    after and based on the determining, performing one of:
        when the dynamic greeting construction is enabled by the callee, dynamically constructing and playing a customized voicemail greeting to a caller based on preferences defined by the callee and also based on at least one of the location and the presence; and
        when the dynamic greeting construction is not enabled by the callee, playing a default voicemail greeting to the caller.

2. The method of claim 1, wherein the preferences comprise a plurality of rules, each one of the rules being associated with a respective one of a plurality of predefined voicemail greetings.

3. The method of claim 2, further comprising determining that one of a plurality of rules is satisfied by at least one of the location and the presence.

4. The method of claim 3, wherein the customized voicemail greeting that is played is the respective one of the plurality of predefined voicemail greetings that is associated with the one of the plurality of rules that is satisfied.

5. The method of claim 2, wherein the plurality of predefined voicemail greetings are defined by the callee via voice XML (vXML).

6. The method of claim 1, wherein a voicemail platform obtains the preferences from a Home Subscriber Server (HSS) and obtains the location and presence from a presence server.

7. The method of claim 1, wherein the callee location and the callee presence are determined prior to the receiving the call.

8. The method of claim 1, wherein a service provider at least one of creates, maintains, deploys and supports a computer infrastructure that performs at least one of the steps of claim 1.

9. The method of claim 1, wherein at least one of the steps of claim 1 are provided by a service provider under a subscription and/or fee agreement and/or based on advertising content to one or more third parties.

10. The method of claim 1, further comprising assembling the customized voicemail greeting using:
    a first message portion selected from a first plurality of message portions associated with callee location;
    a second message portion selected from a second plurality of message portions associated with callee presence;
    a third message portion selected from a third plurality of message portions associated with caller identity; and
    a fourth message portion selected from a fourth plurality of message portions associated with callee alternate communication channels.

11. The method of claim 1, wherein the dynamically constructing and playing the customized voicemail greeting comprises assembling the customized voicemail greeting by inserting a first predefined message portion, a second predefined message portion, and a third predefined message portion into a skeleton.

12. The method of claim 11, wherein:
    the first predefined message portion is associated with callee location;
    the second predefined message portion is associated with callee presence; and
    the third predefined message portion is associated with caller identity.

13. A method of generating and playing a customized voicemail greeting to a caller, comprising:
    determining, by at least one computer device, a callee location and a callee presence;
    assembling, by the at least one computer device, plural predefined message portions into a single customized voicemail greeting based on caller identity and at least one of: the callee location and the callee presence, wherein the assembling is performed at a time of a call from the caller to the callee; and
    playing, by at least one computer device, the customized voicemail greeting to the caller.

14. The method of claim 13, wherein the predefined message portions include:
    a first message portion selected from a first plurality of message portions associated with the callee location;
    a second message portion selected from a second plurality of message portions associated with the callee presence;
    a third message portion selected from a third plurality of message portions associated with caller identity; and
    a fourth message portion selected from a fourth plurality of message portions associated with callee alternate communication channels.

15. The method of claim 13, wherein the callee location and the callee presence are determined prior to the receiving the call.

16. The method of claim 13, wherein a service provider at least one of creates, maintains, deploys and supports a computer infrastructure that performs at least one of the steps of claim 13.

17. The method of claim 13, wherein at least one of the steps of claim 11 are provided by a service provider under a subscription and/or fee agreement and/or based on advertising content to one or more third parties.

18. A system for playing a customized voicemail greeting, comprising:
    a home subscriber server that stores a profile of a user;
    a presence server that determines a presence of the user and receives a location of the user from a location platform; and
    a voicemail platform that operates to:
    obtain the profile from the home subscriber server,
    obtain the location and the presence from the presence server, assemble a customized voicemail greeting by inserting a first predefined message portion, a second predefined message portion, and a third predefined message portion into a skeleton, wherein the a first predefined message portion is associated with callee location, the second predefined message portion is associated with callee presence, and the third predefined message portion is associated with caller identity, and play the customized voicemail greeting to the caller calling the user.

19. The system of claim 18, wherein the profile includes:
location values,
presence values,
rules based on at least one of the location values and the presence values, and
respective greetings associated with the rules.

20. The system of claim 18, wherein the location and the presence are determined prior to receiving a call from the caller.

* * * * *